(12) United States Patent
Reunamaki et al.

(10) Patent No.: US 9,301,124 B2
(45) Date of Patent: Mar. 29, 2016

(54) AUDIO COMMAND-BASED TRIGGERING

(71) Applicant: Nokia Technologies Oy, Espoo (FI)

(72) Inventors: Jukka Pekka Reunamaki, Tampere (FI); Arto Tapio Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 1 day.

(21) Appl. No.: 14/179,094

(22) Filed: Feb. 12, 2014

(65) Prior Publication Data

US 2015/0230075 A1 Aug. 13, 2015

(51) Int. Cl.
*H04B 7/00* (2006.01)
*H04W 8/00* (2009.01)
*G10L 15/22* (2006.01)
*H04W 4/00* (2009.01)
*H04W 76/02* (2009.01)
*H04W 72/04* (2009.01)
*H04W 84/18* (2009.01)

(52) U.S. Cl.
CPC .............. *H04W 8/005* (2013.01); *G10L 15/22* (2013.01); *H04W 4/008* (2013.01); *H04W 76/023* (2013.01); *G10L 2015/223* (2013.01); *H04W 72/0446* (2013.01); *H04W 84/18* (2013.01)

(58) Field of Classification Search
CPC ..... H04W 8/05; H04W 4/008; H04W 76/023; G10L 15/22
USPC ....................... 455/41.1, 41.2, 41.3
See application file for complete search history.

(56) References Cited

U.S. PATENT DOCUMENTS

| | | | |
|---|---|---|---|
| 2010/0332236 A1* | 12/2010 | Tan ............................... | 704/275 |
| 2012/0050153 A1* | 3/2012 | Dvortsov et al. ............. | 345/156 |
| 2014/0047143 A1* | 2/2014 | Bateman et al. ................ | 710/72 |
| 2015/0063219 A1 | 3/2015 | Palin et al. | |
| 2015/0131645 A1 | 5/2015 | Reunamaki et al. | |

OTHER PUBLICATIONS

U.S. Appl. No. 14/076,123, "Device Synchronization", filed on Nov. 8, 2013, 41 pages.
U.S. Appl. No. 14/017,655, "Connection Establishment", filed on Sep. 4, 2013, 44 pages.
"Bluetooth Specification", Bluetooth System, Version 4.0, Jun. 30, 2010, 2302 pages.

* cited by examiner

*Primary Examiner* — Tuan Pham
(74) *Attorney, Agent, or Firm* — Mintz Levin Cohn Ferris Glovsky and Popeo, P.C.

(57) ABSTRACT

Methods and apparatus, including computer program products, are provided for connectivity. In one aspect there is provided a method, which may include detecting, at a first device including an audio detector and a transceiver, an audio command; recording, at the first device, a first timestamp representative of when the audio command was detected; sending, by the first device via the transceiver, one or more packets to discover one or more other devices; detecting, by the first device, at least one response to the sent one or more packets, the at least one response including a second timestamp representative of when the audio command was detected by a second device and a second transceiver; and triggering, by the first device, an action based on a comparison of the first time stamp and the second time stamp.

19 Claims, 6 Drawing Sheets

AUDIO COMMAND-BASED TRIGGERING

FIELD

The subject matter described herein relates to wireless devices.

BACKGROUND

In wireless short-range communication, such as in Bluetooth™ protocol based communication, devices may discovery and connect to one or more other proximate devices. The connection(s) form a piconet or ad-hoc network. Generally, a first device may be considered a so-called "master" when it initiates a connection to second device, which may be referred to as a so-called "slave." The connection initiation process allows the master to discover other devices, and, once discovered, Bluetooth™ connections may be established.

SUMMARY

Methods and apparatus, including computer program products, are provided for connectivity.

The method may include detecting, at a first device including an audio detector and a transceiver, an audio command; recording, at the first device, a first timestamp representative of when the audio command was detected; sending, by the first device via the transceiver, one or more packets to discover one or more other devices; detecting, by the first device, at least one response to the sent one or more packets, the at least one response including a second timestamp representative of when the audio command was detected by a second device and a second transceiver; and triggering, by the first device, an action based on a comparison of the first time stamp and the second time stamp.

In some variations, one or more of the features disclosed herein including the following features can optionally be included in any feasible combination. The response may include an extended inquiry response. The triggered action may include a connection establishment to the second device including the second transceiver, when the first time stamp and the second time stamp indicate the first and second devices are at about the same distance from a source of the audio command. The connection establishment may be initiated when a difference between the first time stamp and the second time stamp indicates the first and second devices are at about the same distance from the source of the audio command. The first timestamp may be based on at least a first Bluetooth™ clock at the first device, and wherein the second timestamp is based on at least a second Bluetooth™ clock at the second device. The first transceiver and the second transceiver may each comprise a short-range transceiver configured in accordance with at least one of a Bluetooth™, a Bluetooth™ Low Energy, and a ZigBee. The predefined action may represent a pairing of the first device and the second device.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
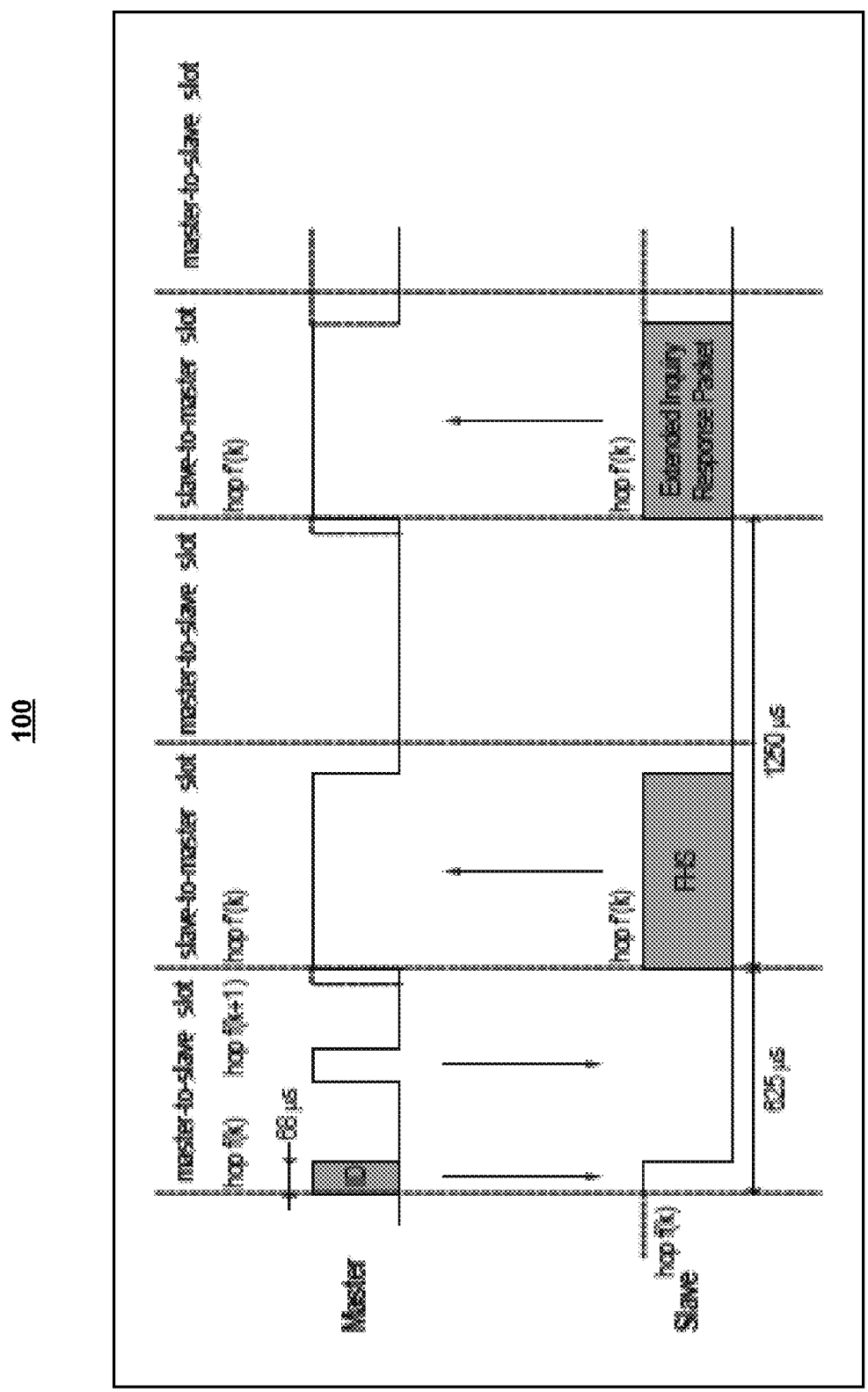
FIG. 1 depicts an example of a Bluetooth™ discovery process, in accordance with some example embodiments.

Like labels are used to refer to same or similar items in the drawings.

DETAILED DESCRIPTION

A non-limiting example short-range communication technology usable for carrying out one or more embodiments of the present invention is Bluetooth™. As noted below, radio technologies other than Bluetooth™ may be used as well.

Bluetooth™ devices may perform a discovery, selection, and connection setup among Bluetooth™ devices to provide a Bluetooth™ wireless connection between the devices. However, this discovery, selection, and connection may be a relatively complex process for a user to perform. In the case of Bluetooth™, a discoverable device may perform an inquiry scan to listen for inquiries from other discovering devices.

FIG. 1 depicts an example of the timing of a Bluetooth™ inquiry process 100 in accordance to some example embodiments. Referring to FIG. 1, a discovering device (for example, "Master") may send inquiry packets (for example, ID packets), and the discoverable device (for example "Slave") may perform inquiry scans to determine whether there are inquiry packets. If so, the discoverable device may respond to the inquiry packets with for example Frequency Hopping Synchronization (FHS) packets. Moreover, the discoverable device may send an Extended Inquiry Response (EIR) packet to deliver information about the discoverable device. The EIR packet may include for example the name of the discoverable device, transmit power, and other information.

In some example embodiments, the subject matter disclosed herein may use an action, such as an audio command and/or any other action, to pair devices, such as Bluetooth™ devices or perform any other predefined operation.

In some example embodiments, an audio command, such as "pair," may be uttered by a user. When this is the case, Bluetooth™ devices may detect the audio command, and log the time when the audio command is received by associating the receipt of the audio command with the time. This timestamp may be a local Bluetooth™ time at the device receiving the audio command. One or more Bluetooth™ devices may then report the audio command including the timestamp to a master (which may also have a log of the audio command and a local timestamp when the audio command was received at the master). For example, the one or more Bluetooth™ devices may send to the master device a Bluetooth™ response message, such as an EIR response, indicating the timestamp of the received audio command. The master device may then compare a difference between timestamps of the responses from one or more Bluetooth™ devices to determine, based on the timestamps, which devices were the intended devices for pairing via a Bluetooth™ connection.

Although some of the examples described herein refer to Bluetooth™, other radio technologies may be used as well including for example, WiBro, Bluetooth™ low energy, ANT, ZigBee, Wi-Fi, wireless universal serial bus (Wireless USB) or any other wireless peer-to-peer technologies. Moreover, although some of the examples described herein refer to the action as an audio command, other types of actions may be used as well. Furthermore, the "pair" audio command is merely an example, as other types of audio commands may be used as well. In addition, predefined operations other than pairing may be implemented as well based on the command.

Figure 2:
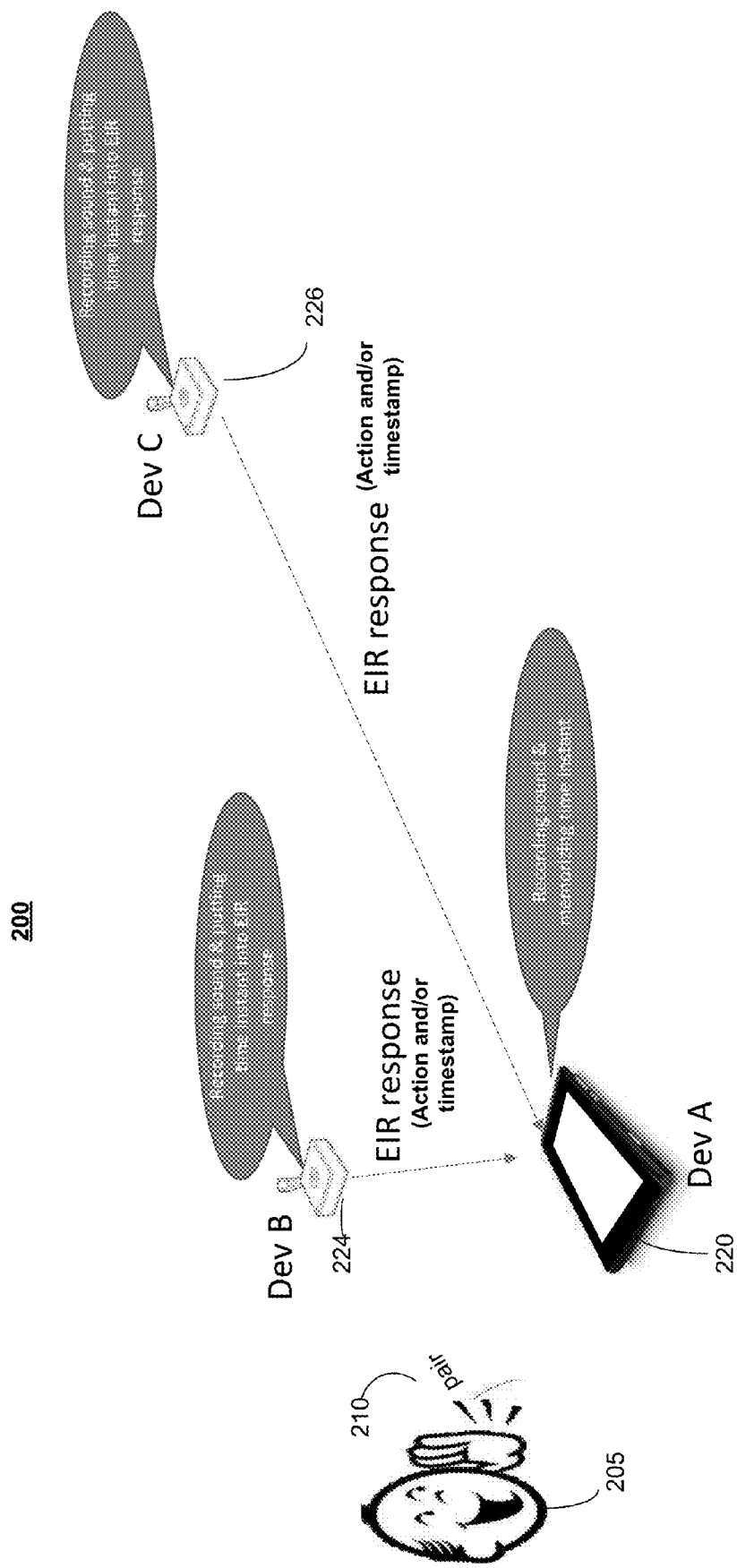
FIG. 2 depicts an example of a system for using an action, in accordance with some example embodiments.

FIG. 2 depicts an example of a system 200 for using an action, such as an audio command and the like, to pair devices, in accordance with some example embodiments.

When a user 205 seeks to pair devices (for example, Bluetooth™ devices 220 and 224), user 205 may perform an action, such as give an audio command 210, "pair," in accordance with some example embodiments. It should be noted that the audio command "pair" 210 is just one example of a command usable in accordance with example embodiments. The audio command 210 may be received at each of the Bluetooth™ devices 220-226, and each of devices 220-226 may record an indication of the detection of the audio command 210 and/or a timestamp of when the audio command is received and/or detected. This timestamp may be a local time at the corresponding device, a native Bluetooth™ clock, and/or any other type of time.

Bluetooth™ device 220 may initiate an inquiry process, in accordance with some example embodiments. The inquiry process may be initiated automatically when the audio command 210 is detected at Bluetooth™ device 220. Alternatively or additionally, Bluetooth™ device 220 may prompt a user (for example, via an indication on a user interface at device 220) whether the inquiry process can proceed.

Bluetooth™ devices 224 and 226 may respond to Bluetooth™ device 220 as part of the inquiry process with a discovery response message, such as an EIR response. The EIR response from Bluetooth™ devices 224 and 226 may include the timestamp and/or an indication of the action (which in this example is an audio command 210 indicating a pairing process).

Figures 3A, 3B:
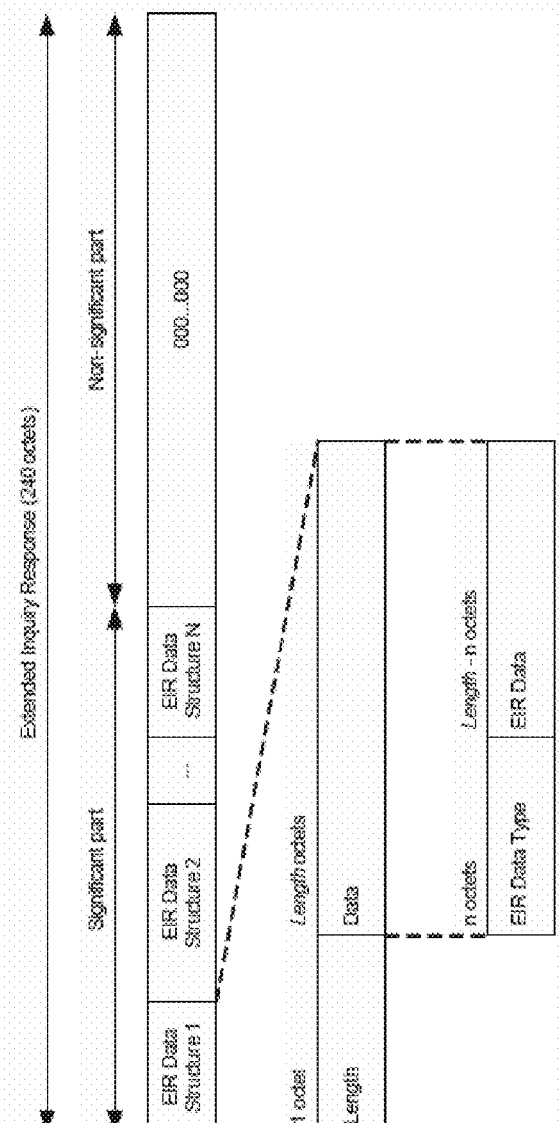
FIGS. 3A-3B depict examples of packets used during the Bluetooth™ discovery process, in accordance with some example embodiments relating to Bluetooth™ based communication.

FIG. 3A depicts an example of an FHS packet payload, which may include native Bluetooth™ clock information for the sender as well as other information, in accordance to some example embodiments relating to Bluetooth™ based communication.

FIG. 3B depicts a simplified example of an EIR packet payload, in accordance with some example embodiments relating to Bluetooth™ based communication. The EIR packet may, in accordance with some example embodiments, indicate receipt of an action, such as audio command 210, and the timestamp. For example, the EIR data structure may take the following form:

| EIR Data type | EIR data |
|---|---|
| 0xFF | Action (2 octets) + BT clock at action (4 octets) | wherein "0xFF" indicates a specific data type (which in this example is the manufacturer data type, but the data type may be used to specifically indicate the command based pair disclosed herein);

Action is an indication of the command, such as audio command 210, and BT clock at action is a time (for example, a Bluetooth™ native clock time) when the audio command was received or detected.

In the case of Bluetooth™, the devices doing the inquiry scan, such as Bluetooth™ device 224, may indicate a current clock value at a resolution of for example, 1.25 milliseconds, although other resolutions may be realized as well. In this example, the timestamp may provide an indication of relative distance on the order of about 0.5 meters, although accuracy may be enhanced when more than one packet is received.

The FHS packets at FIG. 3A may include information updated by a Bluetooth™ controller at the sending device each time the FHS packet is sent, while the EIR packet may include content updated by the sending device to include a detected action, such as the detection of audio command 210, and a corresponding timestamp.

When Bluetooth™ device 220 receives the EIR response, Bluetooth™ device 220 may evaluate any timestamps received to determine distance between devices, to determine clock difference of detection times between devices, to determine whether devices were at about the same distance from a source of the audio command, and/or to determine whether the distance between devices is about the same. In the example of FIG. 2, Bluetooth™ devices 220 and 224 are to be paired and are placed at about the same distance from the user (for example, devices 220 and 224 may be placed near or adjacent to each other as part of pairing), while device 226 (which is not part of the intended pairing) is relatively farther away. In this example, timestamps for audio command pair 210 may indicate the Bluetooth™ devices 220 and 224 are at about the same distance from the source of audio command, while the time stamp for Bluetooth™ device 226 may indicate that device 226 is at a greater distance from the source of the audio command. As such, when Bluetooth™ device 220 compares the relative time calculated from FHS packets and timestamps received in the EIR responses compared to those of device 220 timestamps and native Bluetooth™ clock, Bluetooth™ device 220 may select Bluetooth™ device 224 for pairing via Bluetooth™.

Although the previous example used an action comprising an audio command 210, other types of actions may be used as well. For example, in some example embodiments, an action, such as a shaking or other motion, may be used alone or in combination with the audio command 210 to enhance the accuracy of the pairing. To illustrate further, devices 220 and 224 may be shaken or otherwise moved. In this example, the time associated with the shaking/motion may be recorded as well. Moreover, the EIR response may indicate a timestamp for the detected/received audio command 210 and/or a timestamp for the motion/shaking at devices 220 and 224. When this is the case, Bluetooth™ device 220 may evaluate timestamps for the audio command 210 and/or for shaking/motion to determine whether devices are the likely candidates for pairing via Bluetooth™'.

The timestamp of an action, such as audio command pair 210, detected at a first device (for example, Bluetooth™ device 220) may be compared to the corresponding timestamp for the action/audio command 210 detected at a second device (for example, Bluetooth™ device 224). This comparison may be calculated as follows. When the action/command 210 occurs, timestamps at device 220 and/or 224 may be recorded to indicate when the action/command 210 was received at a given device. In some example embodiments, the timestamp may represent a local Bluetooth™ clock at a given device. The receipt of the action/command 210 may trigger a read of the Bluetooth™ clock value (which may be read via a host control interface (HCI) read command). The recorded timestamp of the action/command at a peer device, such as device 224, may be referred to as CLK_peer_action, and in device 220 as CLK_dev_action, and CLK_peer_action may be carried by an EIR response (in the case of device 224). When device 220 receives the EIR response, device 220 reads the EIR packet including an indication of the action/command and/or timestamp, such as CLK_peer_action. When the FHS packet preceding (as shown in FIG. 1) the EIR packet is received at device 220, the current time of device 220 may be recorded as CLK_dev_fhs, and the current time (or clock) of device 224 may be read from the FHS packet and recorded as CLK_peer_fhs. The difference, CLK_diff, in the received actions may, in some example embodiments, be calculated as follows:

$$CLK\_diff=(CLK\_dev\_fhs-CLK\_dev\_action)-(CLK\_peer\_fhs-CLK\_peer\_action) \quad \text{Equation 1.}$$

Similarly, the difference may be calculated between Bluetooth™ device 220 and Bluetooth™ device 226. Now if the CLK_diff value may be about 0, actions have occurred at two devices at about the same moment. The CLK_diff may be corrected for one or more factors, such as device speed, speed of sound, difference of the distance between devices, and the like, that may affect the calculation. In any case, if Bluetooth™ device 226 is further away from the source of the audio command 210 than Bluetooth™ device 224, the clock difference (CLK_diff) between devices 220 and 226 will be larger than the clock difference (CLK_diff) between devices 220 and 224.

Bluetooth™ device 220 may store, in some example embodiments, the detected Bluetooth™ address, RSSI, the received FHS clock, and the clock in EIR packet information indicating the timestamp of the action/command 210 and perform actions when enough information is gathered. The gathering may cease based for example a time, a number of received responses, RSSI, when a suitable device is found, and/or one or more of the previously noted conditions.

Figure 4:
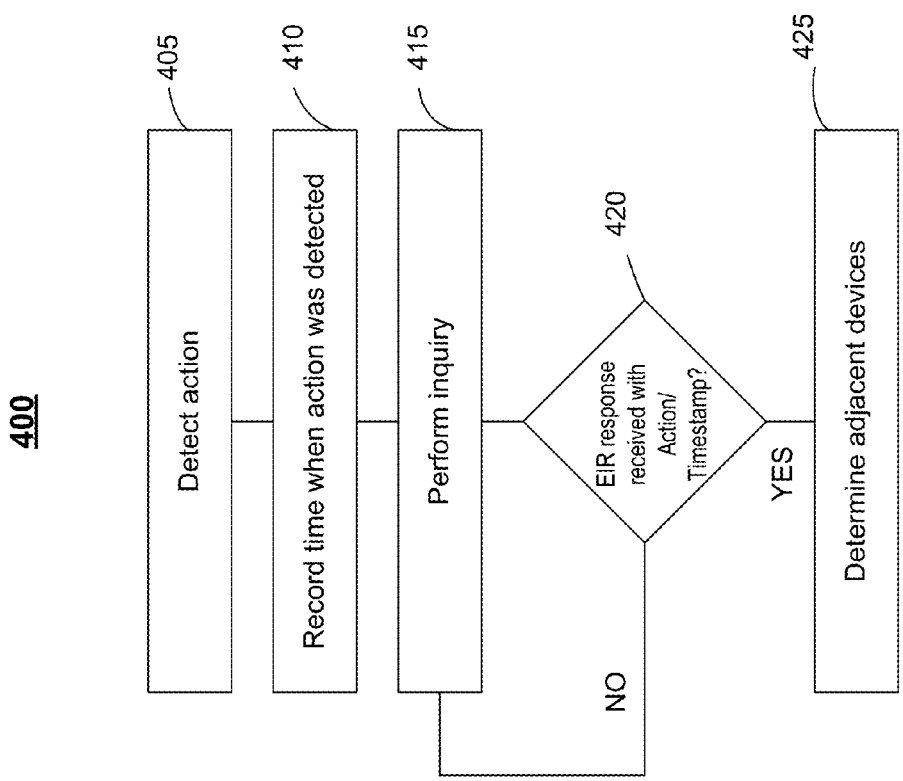
FIG. 4 depicts an example of a triggering an action, in accordance with some example embodiments relating to Bluetooth™ based communication.

FIG. 4 depicts an example process 400 for triggering an action, in accordance with some example embodiments. The description of FIG. 4 also refers to FIG. 2.

At 405, a Bluetooth™ device may detect an action, in accordance with some example embodiments. For example, Bluetooth™ device 220 may detect an action, such as the audio command 210 and the like. This detected action may be indicative of a Bluetooth™ pairing. In the case of an audio command 210, device 220 may include an audio detector (for example, a microphone and the like) to detect the received audio command 210. In example embodiments using other types of actions (for example, motion and the like), the Bluetooth™ device may include a corresponding sensor to detect the action (for example, a motion sensor).

At 410, a Bluetooth™ device may record a time when the detected action is received at the device, in accordance with some example embodiments. For example, Bluetooth™ device 220 may each record a time when the detected audio command 210 is received at device 220. This time may be a native Bluetooth™ time, although other types of times may be used as well. Moreover, the timestamp may be corrected to take into account processing delays at device 220 and other factors as well.

At 415, a Bluetooth™ device may perform a discovery of other devices, in accordance with some example embodiments. For example, Bluetooth™ device 220 may enter into an inquiry mode and thus send ID packets as shown for example at FIG. 1 to discover devices.

At 420, a Bluetooth™ device may receive a message such as an FHS and EIR response, in accordance with some example embodiments. For example, Bluetooth™ device 220 may receive an EIR response, such as EIR response depicted at 3B. Moreover, the EIR response may include data containing an indication of the detected action (for example, the above-noted "Action") and a timestamp (for example, the above-noted "BT clock at action").

If the EIR response includes an indication that a timestamp and/or an action, such as audio command 210, was received, Bluetooth™ device may then proceed to determine which devices are the intended pairing via Bluetooth™ (yes at 420 and 425). For example, Bluetooth™ device 220 may compare the audio command 210 timestamp read from the EIR response from device 224 to the timestamp recorded at device 220 when the audio command was detected at device 220 to determine whether the times indicate the devices are at about the same distance from the source of the audio command. Alternatively or additionally, the determination may use Equation 1 noted above. Moreover, other actions, such as the motion/shaking, of device 220/224 may be taken into account as noted to determine the intended pairing.

If the EIR response does not include the indication that the audio command 210 and/or the timestamp for the command 210 was received, Bluetooth™ device 220 may then continue performing discovery (no at 420 and 415).

It should be noted that also other types of actions may be triggered with the example process 400 shown on FIG. 4. Example actions may include for example initiating establishment of a communication connection between the devices, taking pictures using cameras of two or more devices, establishment of a multiplayer gaming session between two or more devices in the vicinity, or like.

Figure 5:
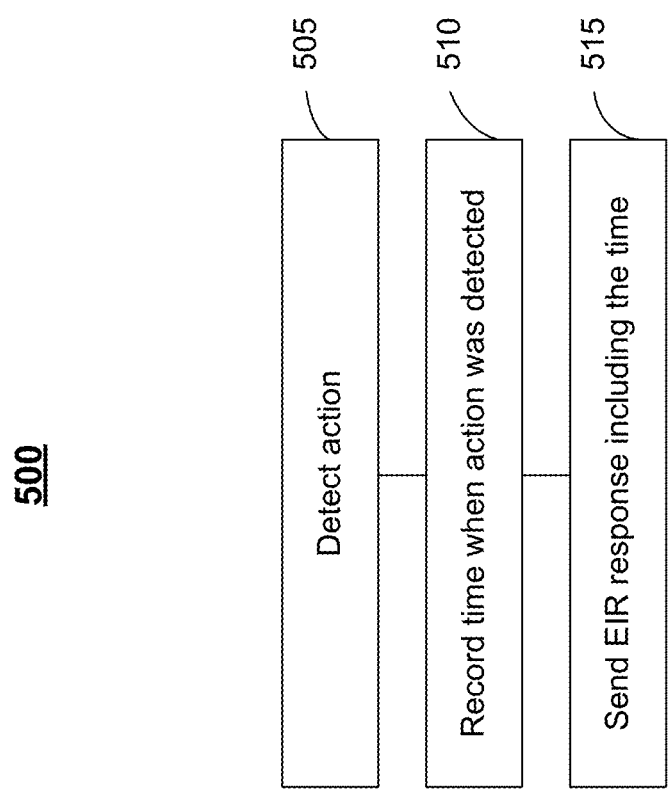
FIG. 5 depicts another example of a triggering an action, in accordance with some example embodiments.

FIG. 5 depicts an example process 500 for triggering an action, in accordance with some example embodiments. The description of FIG. 5 also refers to FIG. 2.

At 505, a Bluetooth™ device may detect an action, in accordance with some example embodiments. For example, Bluetooth™ device 224 (and/or device 226) may detect an action, such as the audio command 210 indicative of a Bluetooth™ pairing. An example of an action is the audio command is a user or device saying "Pair."

At 510, a Bluetooth™ device may record a time when the detected action is received at the device, in accordance with some example embodiments. For example, Bluetooth™ device 224 (and/or device 226) may each record a time when the detected audio command is received at the corresponding device. This time may in accordance with a native Bluetooth™ clock at the corresponding device but other types of clocks may be used as well.

At 515, a Bluetooth™ device may respond with an indication of the time the action was detected at the device, in accordance with some example embodiments. For example, Bluetooth™ device 224 (and/or device 226) may generate an EIR response message, and this message may include an indication of the action (for example, audio command 210 to pair) and a timestamp when the action was detected (for example, a Bluetooth™ time when the audio command pair 210 is detected by the device). This response may enable device 220 to automatically determine which devices were the intended devices of the pair command 210.

Although process 500 refers to a triggered action comprising "pairing," other types of actions may be triggered with the example process 500 shown on FIG. 5. Example actions may include for example initiating establishment of a communication connection between the devices, taking pictures using cameras of two or more devices, establishment of a multiplayer gaming session between two or more devices in the vicinity, and/or like.

Figure 6:
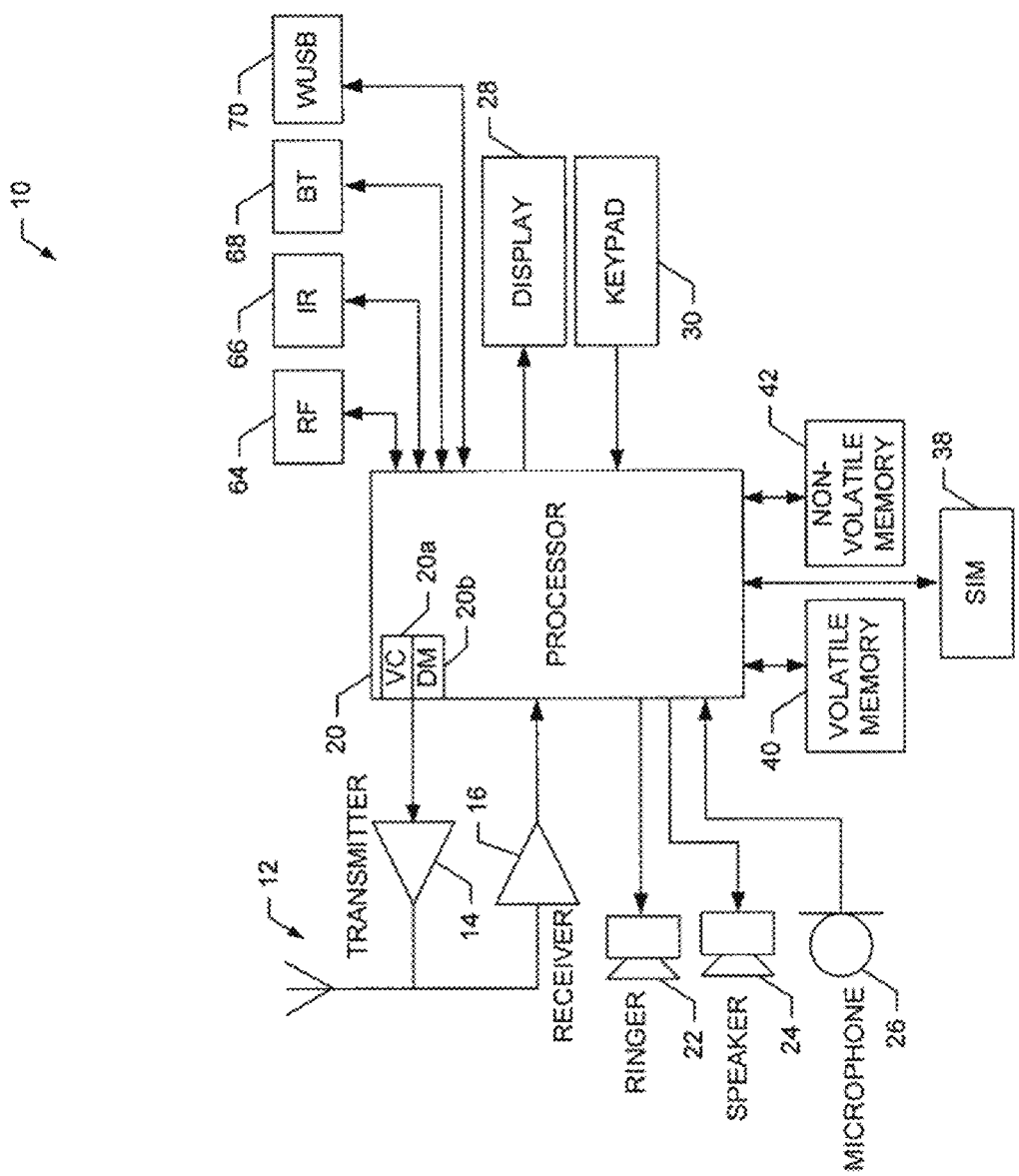
FIG. 6 depicts an example of a user equipment, in accordance with some example embodiments.

FIG. 6 illustrates a block diagram of an apparatus 10, in accordance with some example embodiments. For example, apparatus 10 may comprise a user equipment, such as a smart phone, a smart object, a mobile station, a mobile unit, a subscriber station, a wireless terminal, a tablet, a wireless plug-in accessory, a wireless sensor, a headset, or any other wireless device. The apparatus 10 may correspond to for example the Bluetooth™ device having the touch screen sensor and/or a Bluetooth™ device being detected by the touch screen sensor.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed with respect to process 400 and/or 500 and the like. The memories may comprise an identifier, such as an international mobile equipment identification (IMEI) code, capable of uniquely identifying apparatus 10. In the example embodiment, the processor 20 may be configured using computer code stored at memory 40 and/or 42 to detecting an audio command, recording a first timestamp representative of when the audio command was detected, sending one or more packets to discovery one or more other devices, detecting at least one response to the sent one or more packets, the at least one response including a second timestamp representative of when the audio command was detected by a second device and a second short-range transceiver, and determining the first device and the second device are an intended pairing of the audio command.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is increased selection probability, reliability of connection establishment, and/or ease of connection.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method comprising:
   detecting, at a first device including an audio detector and a transceiver, an audio command;
   recording, at the first device, a first timestamp representative of when the audio command was detected;
   sending, by the first device via the transceiver, one or more packets to discover one or more other devices;
   detecting, by the first device, at least one response to the sent one or more packets, the at least one response including a second timestamp representative of when the audio command was detected by a second device and a second transceiver; and
   triggering, by the first device, an action based on a comparison of the first time stamp and the second time stamp, wherein the triggered action comprises initiating, by the first device a connection establishment with the second device including the second transceiver, when the first time stamp and the second time stamp indicate the first and second devices are at about the same distance from a source of the audio command.

2. The method of claim 1, wherein the response comprises an extended inquiry response.

3. The method of claim 1, wherein the connection establishment is initiated when a difference between the first time stamp and the second time stamp indicates the first and second devices are at about the same distance from the source of the audio command.

4. The method of claim 1, wherein the first timestamp is based on at least a first Bluetooth™ clock at the first device, and wherein the second timestamp is based on at least a second Bluetooth™ clock at the second device.

5. The method of claim 1, wherein the first transceiver and the second transceiver each comprise a short-range transceiver configured in accordance with at least one of a Bluetooth™, a Bluetooth™ Low Energy, and a ZigBee.

6. The method of claim 1, wherein the predefined action represents a pairing of the first device and the second device.

7. An apparatus comprising:
at least one processor; and
at least one memory including computer program code, the at least one processor, the at least one memory, and the computer program code configured to cause the apparatus to at least:
  detect, at the apparatus including an audio detector and a transceiver, an audio command;
  record, at the apparatus, a first timestamp representative of when the audio command was detected;
  send, by the apparatus via the transceiver, one or more packets to discover one or more other devices;
  detect, by the apparatus, at least one response to the sent one or more packets, the at least one response including a second timestamp representative of when the audio command was detected by a second device and a second transceiver; and
  trigger, by the first device, an action based on a comparison of the first time stamp and the second time stamp, wherein the triggered action comprises initiating, by the first device a connection establishment with the second device including the second transceiver, when the first time stamp and the second time stamp indicate the first and second devices are at about the same distance from a source of the audio command.

8. The apparatus of claim 7, wherein the response comprises an extended inquiry response.

9. The apparatus of claim 7, wherein the connection establishment is initiated when a difference between the first time stamp and the second time stamp indicates the first and second devices are at about the same distance from the source of the audio command.

10. The apparatus of claim 7, wherein the first timestamp is based on at least a first Bluetooth™ clock at the apparatus, and wherein the second timestamp is based on at least a second Bluetooth™ clock at the second device.

11. The apparatus of claim 7, wherein the first transceiver and the second transceiver each comprise a short-range transceiver configured in accordance with at least one of a Bluetooth™, a Bluetooth™ Low Energy, and a ZigBee.

12. The apparatus of claim 7, wherein the predefined action represents a pairing of the apparatus and the second device.

13. A non-transitory computer-readable medium encoded with instructions that, when executed by at least one processor in an apparatus, cause the apparatus to perform at least the following:
  detecting an audio command;
  recording a first timestamp representative of when the audio command was detected;
  sending one or more packets to discover one or more other devices;
  detecting at least one response to the sent one or more packets, the at least one response including a second timestamp representative of when the audio command was detected by a second device and a second transceiver; and
  triggering an action based on a comparison of the first time stamp and the second time stamp, wherein the triggered action comprises initiating, by the first device a connection establishment with the second device including the second transceiver, when the first time stamp and the second time stamp indicate the first and second devices are at about the same distance from a source of the audio command.

14. A non-transitory computer-readable medium of claim 13, wherein the connection establishment is initiated when a difference between the first time stamp and the second time stamp indicates the first and second devices are at about the same distance from the source of the audio command.

15. A non-transitory computer-readable medium of claim 13, wherein the first timestamp is based on at least a first Bluetooth™ clock at the first device, and wherein the second timestamp is based on at least a second Bluetooth™ clock at the second device.

16. A non-transitory computer-readable medium of claim 13, wherein the predefined action represents a pairing of the first device and the second device.

17. A method comprising:
  detecting, at a first device including an audio detector and a transceiver, an audio command;
  recording, at the first device, a first timestamp representative of when the audio command was detected;
  sending, by the first device via the transceiver, one or more packets to discover one or more other devices;
  detecting, by the first device, at least one response to the sent one or more packets, the at least one response including a second timestamp representative of when the audio command was detected by a second device and a second transceiver; and
  initiating, by the first device, a connection establishment with the second device including the second transceiver, when the first time stamp and the second time stamp indicate the first and second devices are at about the same distance from a source of the audio command.

18. An apparatus comprising:
at least one processor; and
at least one memory including computer program code, the at least one processor, the at least one memory, and the computer program code configured to cause the apparatus to at least:
  detect, at the apparatus including an audio detector and a transceiver, an audio command;
  record, at the apparatus, a first timestamp representative of when the audio command was detected;
  send, by the apparatus via the transceiver, one or more packets to discover one or more other devices;
  detect, by the apparatus, at least one response to the sent one or more packets, the at least one response including a second timestamp representative of when the audio command was detected by a second device and a second transceiver; and
  initiating, by the first device, a connection establishment with the second device including the second transceiver, when the first time stamp and the second time stamp indicate the first and second devices are at about the same distance from a source of the audio command.

19. A non-transitory computer-readable medium encoded with instructions that, when executed by at least one processor in an apparatus, cause the apparatus to perform at least the following: detecting, at a first device including an audio detector and a transceiver, an audio command;
  recording, at the first device, a first timestamp representative of when the audio command was detected;
  sending, by the first device via the transceiver, one or more packets to discover one or more other devices;
  detecting, by the first device, at least one response to the sent one or more packets, the at least one response including a second timestamp representative of when the audio command was detected by a second device and a second transceiver; and initiating, by the first device, a connection establishment with the second device including the second transceiver, when the first time stamp and the second time stamp indicate the first and second devices are at about the same distance from a source of the audio command.

* * * * *